United States Patent
Burns et al.

(10) Patent No.: US 7,561,803 B2
(45) Date of Patent: Jul. 14, 2009

(54) BI-DIRECTIONAL SIGNAL INTERFACE USING PHOTONIC COUPLER

(75) Inventors: William K. Burns, Alexandria, VA (US); Charles H. Cox, III, Carlisle, MA (US); Rod Waterhouse, Columbia, MD (US)

(73) Assignee: Photonic Systems, Inc., Billerica, MA (US)

( * ) Notice: Subject to any disclaimer, the term of this patent is extended or adjusted under 35 U.S.C. 154(b) by 379 days.

(21) Appl. No.: 11/353,701

(22) Filed: Feb. 14, 2006

(65) Prior Publication Data

US 2007/0189778 A1 Aug. 16, 2007

(51) Int. Cl.
*H04B 10/24* (2006.01)
(52) U.S. Cl. .................. 398/139; 398/116; 398/201
(58) Field of Classification Search .......... 398/201, 398/115–118, 139
See application file for complete search history.

(56) References Cited

U.S. PATENT DOCUMENTS

| | | | |
|---|---|---|---|
| 5,074,631 A | 12/1991 | Hamano et al. | |
| 5,303,079 A | 4/1994 | Gnauk et al. | |
| 6,028,695 A | 2/2000 | Uemura et al. | |
| 6,330,098 B1 | 12/2001 | Gopalakrishnan | |
| 2003/0147581 A1 | 8/2003 | Doi et al. | |

OTHER PUBLICATIONS

Wenzel, Charles, Low Frequency Circulator/Isolator Uses No Ferrite Or Magnet, RF Design Awards.

*Primary Examiner*—Leslie Pascal
(74) *Attorney, Agent, or Firm*—Kurt Rauschenbach; Rauschenbach Patent Law Group, LLC (57) ABSTRACT

A signal interface comprises a non-reciprocal device having a first port that accepts a first electrical signal and a second port that accepts a second electrical signal. The non-reciprocal device passes the second electrical signal through the first port without a phase shift and passes the first electrical signal through the second port with a 180 degrees phase shift. An optical modulator receives an optical signal at an optical input port, a second signal at a first and a second electrical input port, the first electrical signal at a third electrical input port, and the phase-shifted first electrical signal from the non-reciprocal device at a fourth electrical input port. The optical modulator transmits the second electrical signal to the first port of the non-reciprocal device without a phase shift and modulates the first electrical signal on the optical signal and providing the modulated optical signal at an optical output port of the optical modulator.

40 Claims, 9 Drawing Sheets

BI-DIRECTIONAL SIGNAL INTERFACE USING PHOTONIC COUPLER

INTRODUCTION

The section headings used herein are for organizational purposes only and should not be construed as limiting the subject matter described in the present application.

This invention relates generally to signal interfaces, such as antenna signal interfaces, that can perform both transmit and receive functions. An antenna is a conductive structure that carries an electrical current when energized. Antennas are used to transmit and receive electromagnetic waves. When a time varying electrical current is electrically coupled to an antenna, the antenna will radiate an electromagnetic wave. When a time-varying electromagnetic field is received by an antenna, the antenna will generate a time varying electrical current.

Signal interfaces are used to efficiently transfer power. For example, an antenna signal interface is used to efficiently transfer power between the antenna and transmit and/or receive electronics. A transmitter antenna interface is designed to transfer power efficiently from a transmission line that electrically couples a transmitter to the antenna. A receiver antenna interface is designed to transfer power efficiently from the antenna to a transmission line that is electrically coupled to a receiver.

A transceiver antenna interface is a bi-directional interface that is designed to transfer power efficiently from a transmission line that is electrically coupled to a transmitter to the antenna and also is designed to transfer power efficiently from the antenna to a transmission line that is electrically coupled to a receiver.

BRIEF DESCRIPTION OF THE DRAWINGS

The invention, in accordance with preferred and exemplary embodiments, together with further advantages thereof, is more particularly described in the following detailed description, taken in conjunction with the accompanying drawings. The drawings are not necessarily to scale, emphasis instead generally being placed upon illustrating principles of the invention.

DETAILED DESCRIPTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

For example, in some embodiments, the detailed description describes interfacing a transmit signal with a receive signal. It should be understood that the methods and apparatus of the present invention can be applied to interfacing any type of signal and are not limited to interfacing transmit and receive signals. In addition, in some embodiments, the detailed description describes signal interfaces using Z-cut lithium niobate modulators. It is understood that X-cut lithium niobate modulators can also be used. It is also understood that lithium tantalite modulators, and many other electro-optic modulators, such as electro-optic polymers, or semiconductor modulators can be used.

It should be understood that the individual steps of the methods of the present invention may be performed in any order and/or simultaneously as long as the invention remains operable. Furthermore, it should be understood that the apparatus of the present invention can include any number or all the described embodiments as long as the invention remains operable.

Figure 1A:
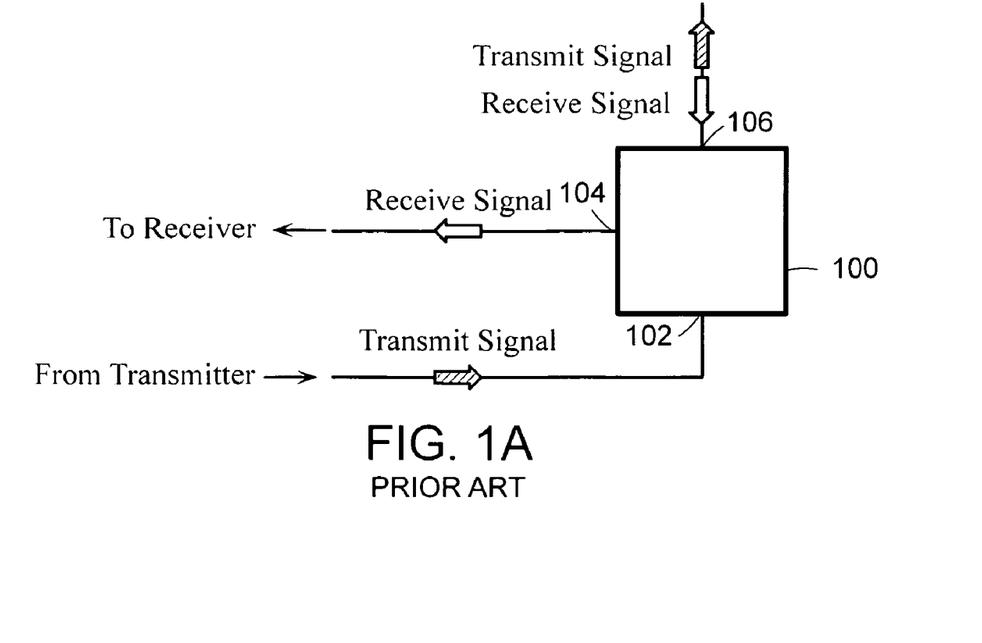
FIG. 1A illustrates a general bi-directional signal interface that is known in the art.

FIG. 1A illustrates a general bi-directional signal interface 100 that is known in the art. The signal interface 100 includes an input port 102 that receives a transmission signal and an output port 104 that passes a reception signal. The signal interface 100 includes a bi-directional port 106 for transmitting and receiving signals.

The signal interface 100 is used to transfer power between the bi-directional port 106 and transmit and receive electronics in a communication system. Known signal interfaces are designed to transfer power efficiently from a transmission line that is electrically coupled to a transmitter to the bi-directional port 106 and also to transfer power efficiently from the bi-directional port 106 to a transmission line that is electrically coupled to a receiver. Known signal interfaces are also designed to isolate the receiver from the transmitter in order to achieve high transmit-receive (T/R) signal isolation. The TR isolation is important because it determines the minimum receive signal levels that the system can handle.

Figure 1B:
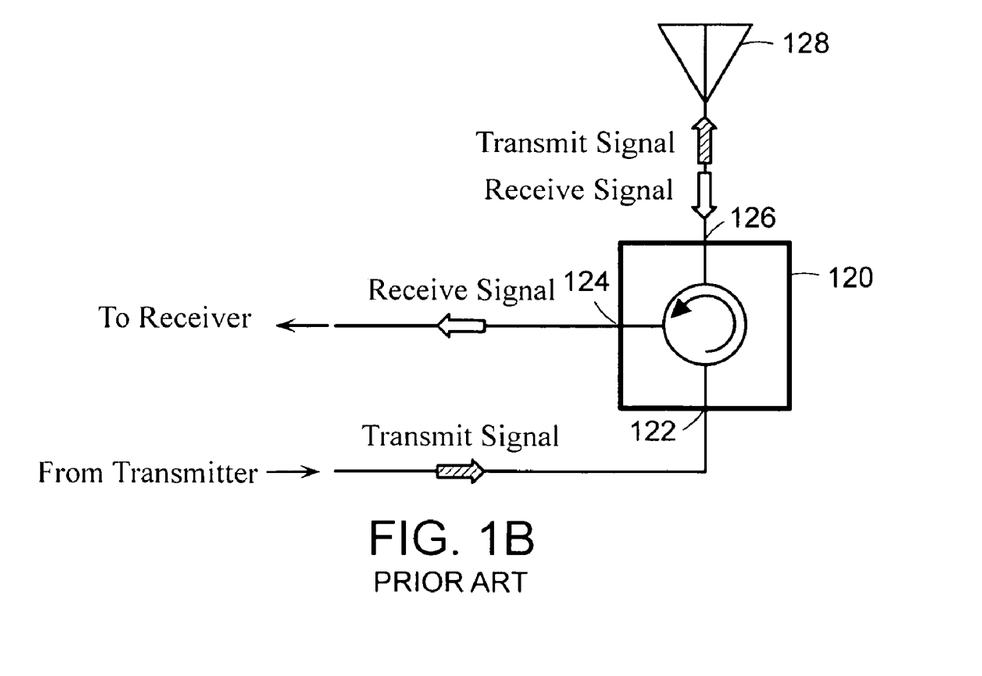
FIG. 1B illustrates a known bi-directional signal interface that includes an electronic circulator.

FIG. 1B illustrates a known bi-directional signal interface that includes an electronic circulator 120, such as a ferrite circulator. The circulator 120 includes an input port 122 that receives a transmission signal from a transmitter and an output port 124 that passes a reception signal to a receiver. The circulator 120 also includes a bi-directional port 126 for transmitting and receiving signals. An antenna 128 is electrically connected to the bi-directional port 126.

The circulator 120 permits full-duplex operation where transmission and reception can occur simultaneously in time. A circulator is a three port non-reciprocal electronic device that is well known in the art. Signals coupled into one port of the circulator are directed to a subsequent port, but not vice versa. In operation, a transmission signal from a transmitter propagates into the input port 122 of the circulator 120 and is directed to the bi-directional port 126, which is electrically coupled to the antenna 128. A signal received from the antenna 128 propagates into the bi-directional port 126 and is directed to the output port 124 that is connected to a receiver.

In theory, the entire transmitted signal propagating into the input port 122 is directed to the bi-directional port 126, which is coupled to the antenna 128; and the entire received signal propagating into the bi-directional port 126 is directed to the output port 124 that is coupled to the receiver. However, in practice a small portion of the transmission signal propagating into the input port 122 leaks to the output port 124.

Circulator-type bi-directional electronic antenna interfaces are often used in conjunction with amplifiers. For example, the input port 122 of the circulator 120 can be coupled to a transmit driver amplifier that is used increase the amplitude of the transmission signal. The output port 124 of the circulator 120 can be coupled to a low noise amplifier (LNA) that is used to amplify the received signal.

The circulator 120 provides inadequate isolation between the transmitter and the receiver for many applications. Receiver-transmitter isolation is necessary because a typical transmission power level can be 1.0 to 10 W and typical LNAs can be damaged by input powers ranging from 1-10 mW (depending on the size and bandwidth of the LNA). Thus, a minimum of 30 dB of receive-transmit isolation is typically required. For many applications receive-transmit isolation should be greater than 100 dB. Commercially available electronic circulators provide isolation of about 14 dB at frequencies up to 10 GHz, but only over fractional bandwidths of 3:1 or less. However, the magnitude of the isolation decreases as the fractional bandwidth increases. Consequently, input power limiting devices, such as diodes, are sometimes used to protect the sensitive LNA from damage. Furthermore, such wideband circulators typically have significant loss that can be on order of 1 dB. This loss adds to the minimum receiver noise figure and cannot be recovered by subsequent stages of amplification.

Receiver-transmitter isolation is also necessary to perform simultaneous transmission and reception at the same or different frequencies. Poor receiver-transmitter isolation can result in some "leaking" or "bleed-through," where transmission signals propagate in receiver channels. Bleed-through of the stronger transmit signal can prevent the receiver from detecting the weaker desired receive signal. In addition, circulators are relatively large and heavy devices because they include permanent magnets that are required to induce the non-reciprocal effect in the circulator material.

Figure 1C:
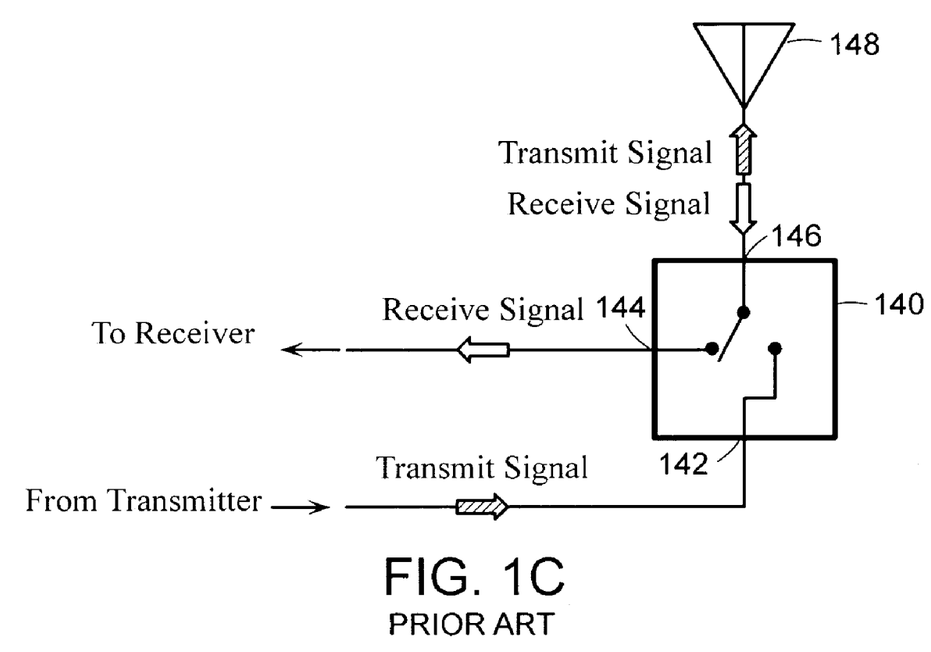
FIG. 1C illustrates a known bi-directional signal interface that includes an electronic switch.

FIG. 1C illustrates a known bi-directional signal interface that includes an electronic switch 140. The switch 140 includes an input port 142 that receives a transmission signal from a transmitter and an output port 144 that passes a reception signal to a receiver. The switch 140 also includes a bi-directional port 146 for transmitting and receiving signals. An antenna 148 is electrically connected to the bi-directional port 146.

The switch 140 performs half-duplex operation where it can receive a reception signal or transmit a transmission signal, but can not simultaneously receive a reception signal and transmit a transmission signal. Simultaneous transmission and reception is not possible because the transmission and the received signal cannot overlap in time. The isolation of the input port 142 and the output port 144 of the switch 140 is generally at least 40 dB, which is greater than the isolation of the input port 122 and the output port 124 of many circulators.

Other known antenna interfaces use diplexers. However, diplexers are narrow-bandwidth devices. Also, transmit and receive signal frequency bands in diplexers can not overlap. Diplexers also have relatively high loss. Still other antenna interfaces use couplers and/or taps, but such interfaces have relatively high loss.

Antenna feeds that include Mach Zehnder interferometers (MZIs) configured in a bi-directional signal implementation have been recently proposed in pending U.S. patent application Ser. No. 10/710,463, entitled, "Bi-Directional Signal Interface," which is assigned to the assignee of the present application. The entire description of U.S. patent application Ser. No. 10/710,463 is incorporated herein by reference.

Figure 2:
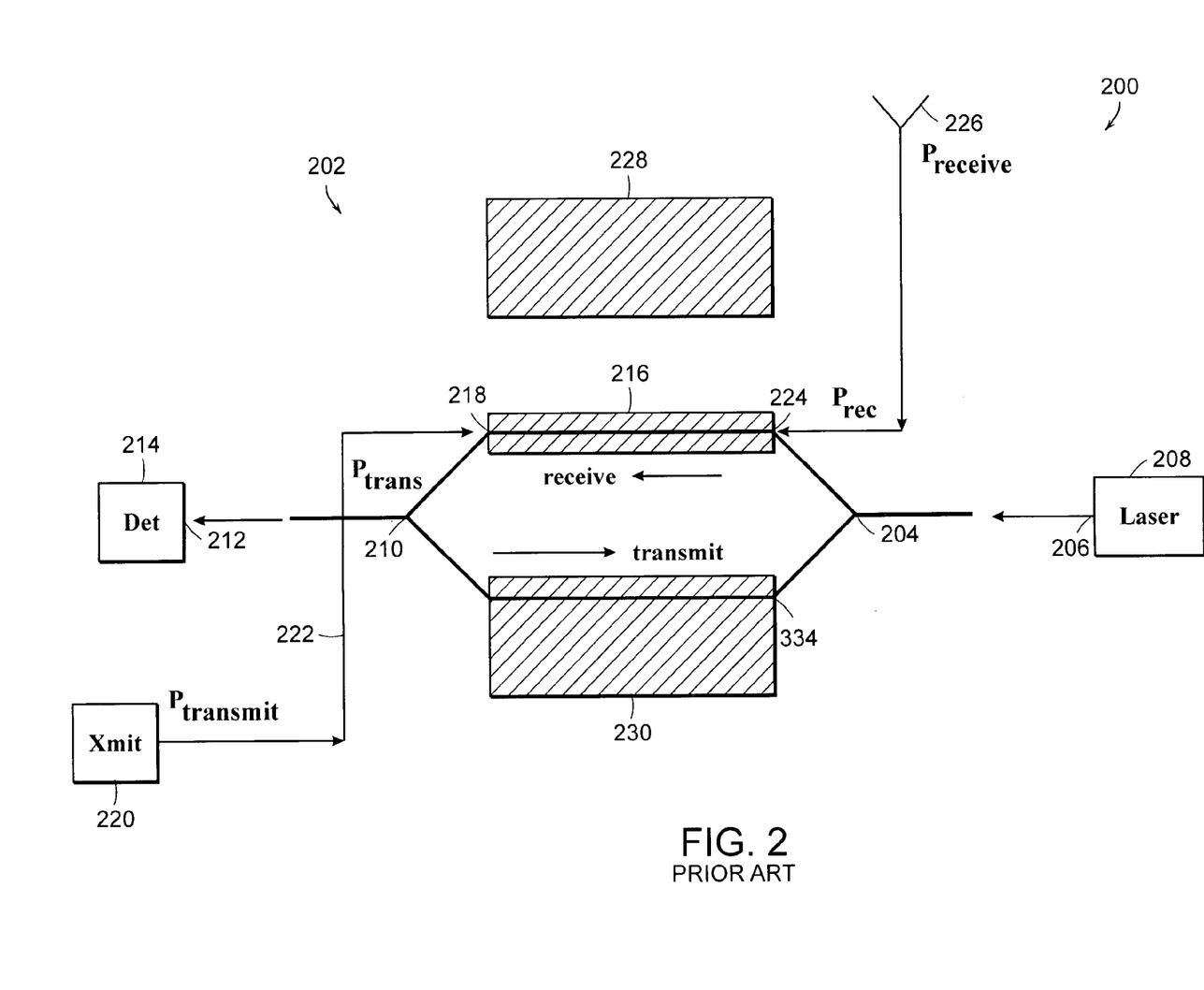
FIG. 2 illustrates a known bi-directional signal interface that includes a Z-cut Lithium Niobate interferometric optical modulator.

FIG. 2 illustrates a known bi-directional signal interface 200 that includes a Z-cut Lithium Niobate interferometric optical modulator 202. Using a Z-cut Lithium Niobate optical modulator has the advantage of having a relatively low half-wave voltage (Vπ). However, modulators with other materials and/or crystal orientations can also be used. The optical modulator 202 includes an optical input 204 that is optically coupled to an output 206 of a laser 208 and an optical output 210 that is optically coupled to an input 212 of an optical detector 214, such as a photodiode.

The optical modulator 202 also includes a traveling-wave co-planar waveguide (CPW) electrode structure that is commonly used for Z-cut lithium niobate devices. The electrode structure includes a first hot electrode 216 having a first port 218 that is electrically connected to a transmitter 220 with a transmission line 222. The electrode structure also includes a second port 224 that is electrically connected to an antenna 226. In addition, the electrode structure also includes a first 228 and a second ground electrode 230 that are electrically connected to ground potential.

The optical modulator 202 is operated in a bi-directional mode to achieve both transmit and receive operations. The output 210 of the optical modulator 202, as seen by the detector 214, can be expressed by the following equation:

$$I_{out} = \frac{1}{2}(1 + \cos(\Delta\phi + \phi_{bias}))$$

where $\phi_1$ is the optical phase in the first hot electrode 216, $\phi_2$ is the optical phase in the second ground electrode 230, and $\Delta\phi = \phi_1 - \phi_2$, is the difference of the accumulated optical phases in the arms of the interferometer comprising the optical modulator 202. The phases will be different depending on whether the optical modulator 202 is operated in the transmit mode or in the receive mode. In normal operation $$|\phi_2| << |\phi_1|.$$

The bias phase, $\phi_{bias}$=90 degrees, when the optical modulator 202 is operated at quadrature, which results in maximum sensitivity to small signals.

The T/R isolation is determined by a small, but non-zero counter-propagating interaction in the transmit mode. The T/R isolation of the bi-directional signal interface 200 is in the range of −20 to −50 dB over a 2:1 bandwidth in the 6-12 GHz range. The high T/R isolation is a result of the difference in coupling between co- and counter-propagating electromagnetic waves relative to the optical wave. There is a fundamental relationship between the length of the traveling wave interaction in the optical modulator 202 and the minimum frequency at which any significant T/R isolation is achieved. For example, present commercially available electro-optic modulators can not achieve any significant T/R isolation below about 1 GHz. Unfortunately, this limitation prevents the use of the bi-directional signal interface 200 for many important applications.

Signal interfaces according to the present invention include electro-optical modulators with dual drives. Some embodiments of the present invention do not utilize traveling wave effects and, therefore, do not suffer from the frequency/interaction length limitations of the signal interface 200 described in connection with FIG. 2. Thus, the signal interfaces of the present invention can operate at much lower frequencies than the signal interface 200 described in connection with FIG. 2. In theory, the signal interface of the present invention can operate near DC. In addition, the signal interface of the present invention can simultaneously achieve high transmit/receive isolation, high receive sensitivity, and low noise figure.

Figure 3A:
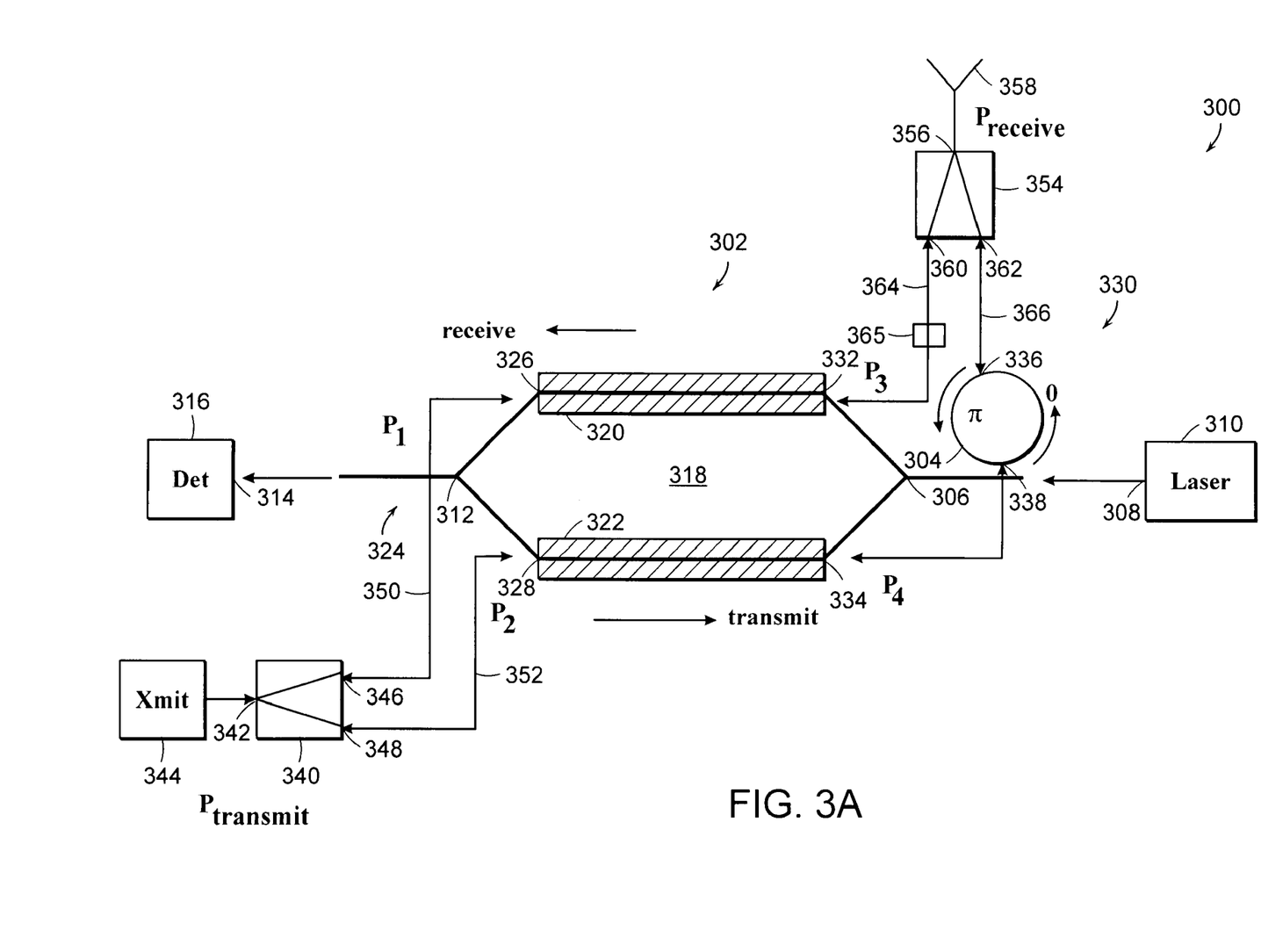
FIG. 3A illustrates one embodiment of a signal interface of the present invention that uses an interferometric optical modulator with a dual drive and a non-reciprocal element that provides non-reciprocal phase control to interface a first and a second electrical signal.

FIG. 3A illustrates one embodiment of a signal interface 300 of the present invention that uses an interferometric optical modulator 302 with a dual drive and a non-reciprocal element 304 that provides non-reciprocal phase control to interface a first and a second electrical signal. The optical modulator 302 includes an optical input port 306 that receives an optical signal from an output 308 of a laser 310 or other optical source and an optical output port 312 that is optically coupled to an input 314 of an optical detector 316.

The optical modulator 302 includes an electrode structure 318 that includes a first 320 and a second electrode 322. The first and the second electrodes 320, 322 are hot electrodes that are electrically independent. The ground electrode structure is not shown in FIG. 3A. In some embodiments, the electrode structure 318 velocity matches electrical signals propagating in the differential mode to an optical field of the optical signal.

The signal interface 300 is configured so that the optical modulator 302 has a common mode input 324 including a first 326 and a second electrical input 328 that both receive the second electrical signal with substantially the same phase and the same amplitude. The signal interface 300 is configured so that the optical modulator 302 has a dual drive input 330 that includes a third 332 and a fourth electrical input 334. The third electrical input 332 receives the first electrical signal. The fourth electrical input 334 receives the first electrical signal shifted in phase by 180 degrees.

Most commercially available external optical modulators can be configured in a dual drive configuration. One skilled in the art will appreciate that any one of numerous types of interferometric optical modulator can be used with the present invention. For example, the optical modulator 302 can be an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic organic modulator, or an electro-optic inorganic modulator.

The non-reciprocal device 304 has a first port 336 that accepts a first electrical signal and a second port 338 that accepts a second electrical signal. The non-reciprocal device 304 passes the second electrical signal through to the first port 336 of the non-reciprocal device 304 without a phase shift and passes the first electrical signal through to the second port 338 with a 180 degrees phase shift. Thus, the non-reciprocal device 304 provides a 180 degree phase shift for the differential mode input 330 of the optical modulator 302.

One skilled in the art will appreciate that the non-reciprocal device 304 can be any one of numerous types of non-reciprocal devices known in the art. For example, the non-reciprocal device 304 can be a RF circulator, a combination of RF circulators, a gryrator, a switch, or some combination of one or more RF circulators, gyrators, and switches. Gyrators are two-port non-reciprocal devices having a 180 differential degree phase shift. Gyrators can be implemented as a phase shifter with a 180 degree differential phase shift. Passive gyrators can be constructed with permanent magnets that provide bias. Switches, such as the switch that is described in connection with FIG. 1C, perform half-duplex operation where they can receive a reception signal or transmit a transmission signal, but can not simultaneously receive a reception signal and transmit a transmission signal.

In some embodiments, combination splitter and combiner are used to split and combine the first and the second electrical signals. A first splitter/combiner 340 includes a first port 342 that receives the second electrical signal, which can be a transmit signal from a transmitter 344. The first splitter/combiner 340 splits the second electrical signal into two substantially equal signals having substantially the same amplitude and phase and provides these signals to a second 346 and a third port 348. A first 350 and second transmission line 352 couple a respective one of the first 346 and the second port 348 of the first splitter/combiner 340 to the first 326 and second input 328 of the electrode structure 318 of the optical modulator 302 so that the common mode input 324 of the electrode structure 318 receives the second signal.

A second splitter/combiner 354 includes a first port 356 that receives the first electrical signal, which can be a receive signal from an antenna 358. The second splitter/combiner 354 splits the first electrical signal into two substantially equal signals having substantially the same amplitude and phase and provides these signals at a third 360 and a fourth port 362. A third transmission line 364 couples the second port 360 of the second splitter/combiner 354 to the third input 332 of the electrode structure 318. A fourth transmission line 366 couples the second port 362 of the second splitter/combiner 354 to the first port 336 of the non-reciprocal device 304.

In some embodiments, a path length stretcher is used to adjust the electrical path of the first and the second electrical signals propagating through the non-reciprocal device 304 so that the path length of the first and the second electrical signals propagating through the electrode structure 318 of the optical modulator 302 are matched. For example, a path length stretcher 365 can be coupled into the third transmission line 364 to change the path length from the second electrode 322 to the second port 360 of the second splitter/combiner 354 to equal the path length from the fourth electrical input port 334 to the second port 362 of the second splitter/combiner 354.

In some embodiments, an attenuator or an amplifier is used to adjust the amplitude of signals propagating through the non-reciprocal device 304 so that the amplitude of the respective portions of the first and the second electrical signals propagating through the electrode structure 318 of the optical modulator 302 are matched. For example, an attenuator can be coupled into the third transmission line 364 to add an attenuation that matches the attenuation that the first and second electrical signals experience while propagating through the non-reciprocal device 304.

The optical modulator 302 passes the second electrical signal on the first and second electrodes 320, 322. The second electrical signal passes through the first port 336 of the non-reciprocal device 304 without a phase shift. In many embodiments, substantially all the second electrical signal passes through the first and the second electrodes 320, 322 without significantly modulating the optical signal. The second splitter/combiner 354 combines the second electrical signal from the first electrode 320 with the second electrical signal from the second electrode 322 that passes through the first port 336 of the non-reciprocal device 304. The resulting combined electrical signal can be transmitted to the antenna 358 or other signal transmission element.

In addition, the optical modulator 302 modulates the first electrical signal on the optical signal and provides the modulated optical signal at the optical output port 312 of the optical modulator 302. In some embodiments, the optical signal is modulated by substantially all the first electrical signal. The optical detector 316 detects the modulated optical signal. In some embodiments, the optical detector 316 is a photodetector that converts the modulated optical signal to the first electrical signal.

Figure 3B:
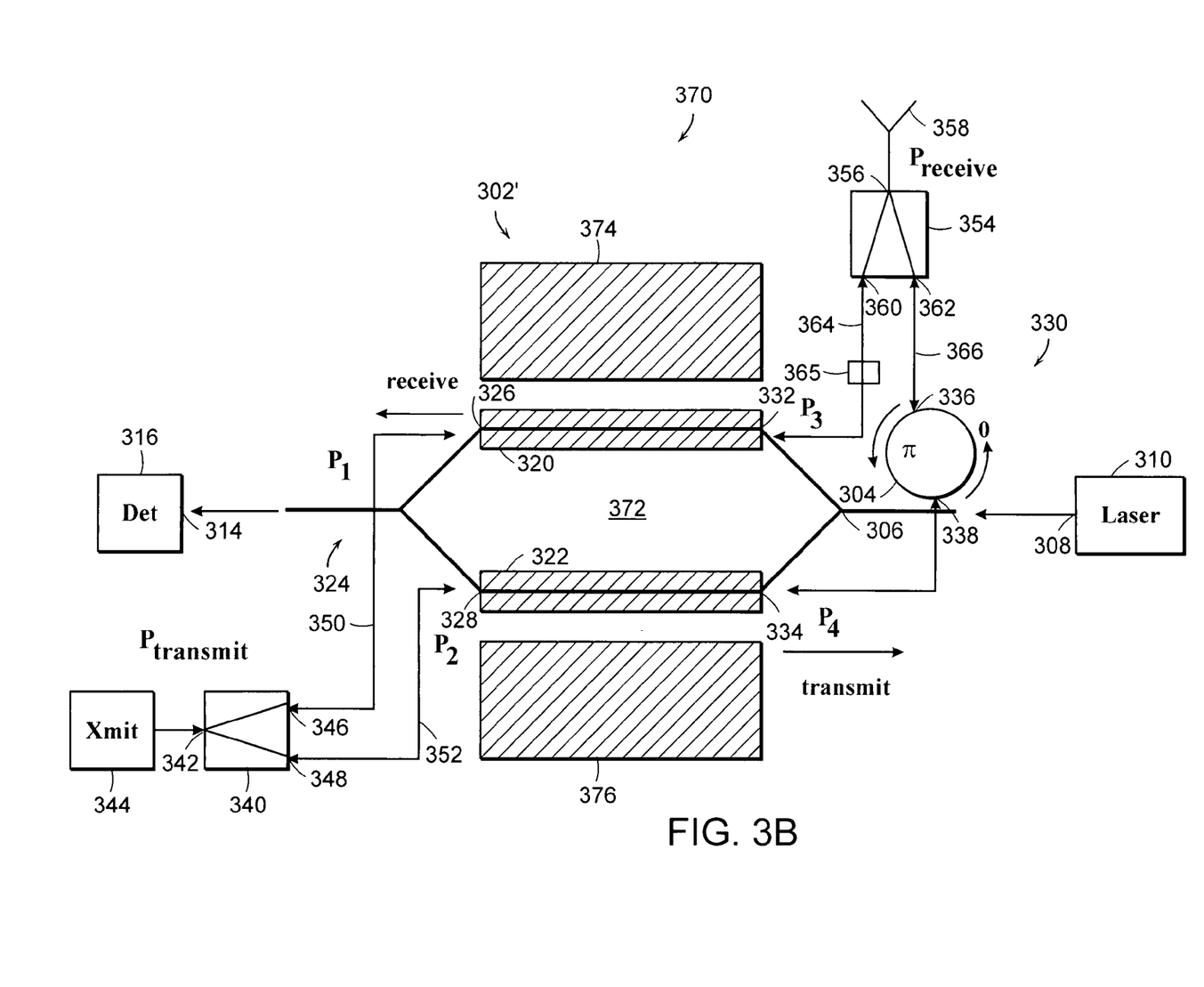
FIG. 3B illustrates one embodiment of a signal interface of the present invention that uses an interferometric optical modulator with a dual drive co-planar stripline electrode structure and a non-reciprocal element that provides non-reciprocal phase control to interface a first and a second electrical signal.

FIG. 3B illustrates one embodiment of a signal interface 370 of the present invention that uses an interferometric optical modulator 302' with a dual drive co-planar stripline electrode structure 372 and a non-reciprocal element 304 that provides non-reciprocal phase control to interface a first and a second electrical signal. The signal interface 370 is similar to the signal interface 300 that is described in connection with FIG. 3A. However, the electrode structure 372 of the optical modulator 302' includes a first 374 and a second ground electrode 376 that are positioned adjacent to the first 320 and second electrode 322 in a co-planar strip-line configuration.

The placement of the electrode structure 372 in the optical modulator 302' is chosen for a Z-cut lithium niobate modulator. The separation between the first 320 and second electrode 322 is great enough so that these electrodes are not electromagnetically coupled. In other embodiments, the separation between the first 320 and second electrode 322 is such that there is at least some electromagnetic coupling. The co-planar stripline electrode structure 372 supports a quasi-TEM mode of propagation. The co-planar stripline electrode structure 372 has a relatively high impedance compared with co-planar waveguide electrode structures, such as the co-planar waveguide electrode structure 382 described in connection with FIG. 3C. The relatively high impedance results in a relatively high power transfer efficiency to antennas and can be used to construct a relatively high performance of the antenna feed.

Figure 3C:
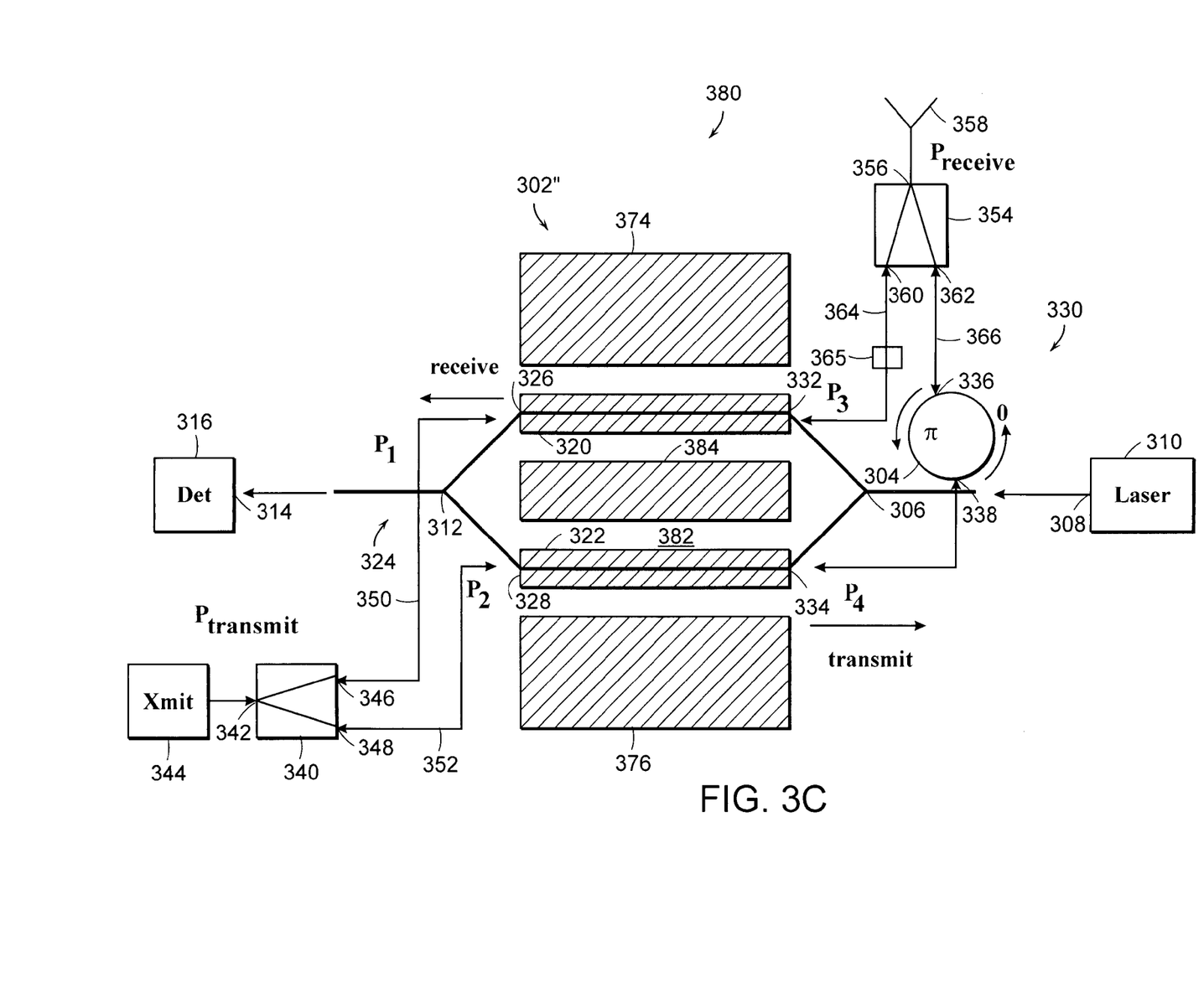
FIG. 3C illustrates one embodiment of a signal interface of the present invention that uses an interferometric optical modulator with a dual drive co-planar waveguide electrode structure and a non-reciprocal element that provides non-reciprocal phase control to interface a first and a second electrical signal.

FIG. 3C illustrates one embodiment of a signal interface 380 of the present invention that uses an interferometric optical modulator 302" with a dual drive co-planar waveguide electrode structure 382 and a non-reciprocal element 304 that provides non-reciprocal phase control to interface a first and a second electrical signal. The signal interface 380 is similar to the signal interfaces 300, 370 that are described in connection with FIGS. 3A and 3B. In particular, the signal interface 380 is identical to the signal interface 370 described in connection with FIG. 3B except that it has an additional ground electrode 384.

The placement of the electrode structure 382 in the optical modulator 302" is chosen for a Z-cut lithium niobate modulator. The electrode structure 382 of the signal interface 380 includes the first 374 and the second ground electrode 376 that are positioned adjacent to a respective one of the first 320 and the second electrode 322 in a co-planar strip-line configuration. In addition, the electrode structure 382 of the signal interface 380 includes a third ground electrode 384 that is positioned between the first 320 and the second electrode 322 in a co-planar waveguide configuration. The separation between the first 320 and second electrode 322 is great enough so that these electrodes are not electromagnetically coupled through the third ground electrode 384.

The presence of the third ground electrode 384 allows the electrode structure 382 to support both even or odd quasi-TEM modes of propagation depending upon whether the electric fields between the first electrode 320 and the ground electrodes 374, 384 are in the same or in the opposite direction as the electric fields between the second electrode 322 and the ground electrodes 376, 384.

In operation, the signal interfaces 300, 370, and 380 of the present invention interfaces two signals. The non-reciprocal device 304 is used to generate a differential mode first electrical signal with a 180 degree differential phase shift. In other embodiments, the differential mode signal is generated by other techniques known in the art. The differential mode first electrical signal is applied to the differential input 330 of the optical modulator 302, 302', and 302" (collectively referred to as 302).

In one example, the first electrical signal is a receive signal from an antenna 358 or a receiver and the second signal is a transmit signal from a transmitter. The non-reciprocal device 304 is connected between the antenna 358 or receiver and the modulator 302. The receive signal is applied as a differential signal. The non-reciprocal device 304 inserts a 180 degree phase inversion into the receive path 366.

The optical modulator 302 modulates the optical signal from the laser 310. The optical signal can be a continuous wave or a pulsed optical signal. In some embodiments, the optical modulator 302 modulates substantially all the optical signal with the differential mode first electrical signal. In some embodiments, the differential mode first electrical signal is velocity matched to an optical field of the optical signal. The optical signal modulated by the first electrical signal is then detected by the detector 316.

A second electrical signal is applied to the common mode input 324 of the optical modulator 302. The second electrical signal is transmitted through the optical modulator 302 without substantial modulation. The common mode drive eliminates (at least theoretically) the leakage of the second electrical signal into the first electrical signal path. In many embodiments, substantially all the common mode second electrical signal is transmitted through the optical modulator 302 and the optical signal is not substantially modulated by the second electrical signal.

In one example, the second electrical signal is a transmit signal generated by the transmitter 344. The first splitter/combiner 340 splits the transmit signal into two transmit signals having substantially the same amplitude and substantially the same phase. The transmit signals are transmitted through the first 320 and the second electrode 322 of the optical modulator 302 without substantial modulation of the optical signal and without substantial leakage into the receive signal electrical signal path. The non-reciprocal device 304 does not change the phase of the transmit signal propagating through the second electrode 322. The second splitter/combiner 354 combines the second electrical signal propagating in the first 320 and the second electrode 322 and directs the combined second electrical signal to the antenna 358.

Using this method, the T/R isolation, which is the ratio of the second signal to the first signal (or the transmit signal to the receive signal), is theoretically infinite because, in theory, there is no response to the common mode signal. Furthermore, using this method, a high T/R isolation can be achieved over a wide bandwidth that includes low frequencies close to DC, because this method uses a difference in modulation rather than a difference in the coupling of traveling waves. In addition, the receive signal can be received and the transmit signal can be transmitted simultaneously in time.

The methods of interfacing two signals according to the present invention can also be used with some known signal interfaces that include traveling wave modulators configured with dual drives. For example, the method of the present invention can be used with the signal interface 200 that was described in connection with FIG. 2. Using the signal interface 200 with a dual drive according to the present invention will result in additional increases in T/R isolation.

More specifically, a method of interfacing an electrical receive signal and an electrical transmit signal according to the present invention includes propagating a first and a second portion of the electrical transmit signal through a respective one of the first 326 and the second electrical port 328 of the optical modulator 302. In many embodiments, the first and the second portion of the electrical transmit signal have substantially the same amplitude and the same phase.

The first portion of the electrical transmit signal is passed to the first port 360 of the second splitter/combiner 354. The second portion of the electrical transmit signal is passed to the non-reciprocal device 304 that maintains the phase of the second portion of the electrical transmit signal and then to the second port 362 of the second splitter/combiner 354. The first and the second portions of the electrical transmit signals combine substantially in phase at the second splitter/combiner 354. The second splitter/combiner 354 directs the combined electrical transmit signal to the antenna 358 or other transmission device.

In some embodiments, the first portion of the electrical transmit signal is attenuated by an attenuator so that the amplitude of the first portion of the electrical transmit signal substantially equals the amplitude of the second portion of the electrical transmit signal when being combined by the second splitter/combiner 354. In these embodiments, the attenuator provides the same loss that occurs when passing the second portion of the electrical transmit signal through the non-reciprocal device 304 and any additional transmission and device losses experienced by the second portion of the electrical transmit signal that are not experienced by the first portion of the electrical transmit signal.

In many embodiments, the optical modulator 302 is operated at quadrature, where $\phi_{bias}=90$ degrees for maximum sensitivity to small signals. If the power of the first and the second portions of the electrical transmit signal are equally divided at the first splitter/combiner 340 and the first and second portions of the electrical transmit signal arrive at their respective electrical input port 326, 328 of the optical modulator 302 with the same phase, then the optical intensity at the output 312 of the optical modulator 302 can be expressed by the following equation:

$$I_{out} = \frac{1}{2}(1 + \cos(\phi_{bias})) = \frac{1}{2}$$

since $\phi_1$ and $\phi_2$ are equal and have the same sign in common mode operation so that $\Delta\phi=0$. Thus, there is no time varying signal at the output 312 of the optical modulator 302. There is only a DC level which can be easily filtered out.

A first portion of the electrical receive signal is applied to the third electrical input port 332 of the optical modulator 302. The non-reciprocal element 304 phase shifts the second portion of the electrical receive signal by 180 degrees. The phase shifted electrical receive signal is then applied to a fourth electrical input port 334 of the optical modulator 302. In some embodiments, the path length of one or both of the first and the second portion of the electrical receive signal is stretched so that the path length of the second portion of the electrical receive signal is approximately equal to the path length of the first portion of the electrical receive signal.

The optical modulator 302 modulates an optical signal with the electrical receive signal and the phase shifted electrical receive signal. In some embodiments, the electrical receive signal and the phase shifted electrical receive signal are velocity matched to an optical field of the optical signal in order to increase the modulation efficiency. The optical signal can be a continuous wave optical beam or can be a pulsed optical beam. In many embodiments, the optical signal is modulated by substantially all the electrical receive signal and the phase shifted electrical receive signal and is not significantly modulated by the electrical transmit signal.

The modulated optical signal is then detected by the detector 316 and the electrical receive signal is extracted from the detected modulated signal. In some embodiments, the optical signal is detected by the detector 316 at the same time that the electrical transmission signal is transmitted through the antenna.

The phase difference in embodiments where the power of the electrical receive signal and the power of the phase shifted electrical receive signal are equal and where the electrical receive signal and the phase shifted electrical receive signal arrive at the third 332 and the fourth electrical input port 334 of the optical modulator 302 exactly 180 degrees out-of-phase can be represented by the following equation:

$$\Delta\phi=\phi_1-\phi_2=2|\phi_1|$$

where $\phi_1$ is the optical phase in the first electrode 320 of the optical modulator 302 and $\phi_2$ is the optical phase in the second electrode 322 of the optical modulator 302.

The optical intensity at the output 312 of the optical modulator 302 can then be expressed by the following equation:

$$I_{out} = \frac{1}{2}(1 + \cos(2|\phi_1| + \phi_{bias})).$$

The non-reciprocal element 304 according to the present invention provides maximum electro-optic efficiency for the receive signal, but zero electro-optic efficiency for the transmit signal. The non-reciprocal element 304 also achieves infinite T/R isolation for ideal components. However, in practice, one or more variable attenuators can be used to equalize the insertion loss of the non-reciprocal element 304. Also, one or more variable line stretcher can be used in the signal paths to balance the electrical length of signals propagating through the first electrode 320 with the electrical length of signals propagating through the second electrode 322 of the optical modulator 302.

Figure 4A:
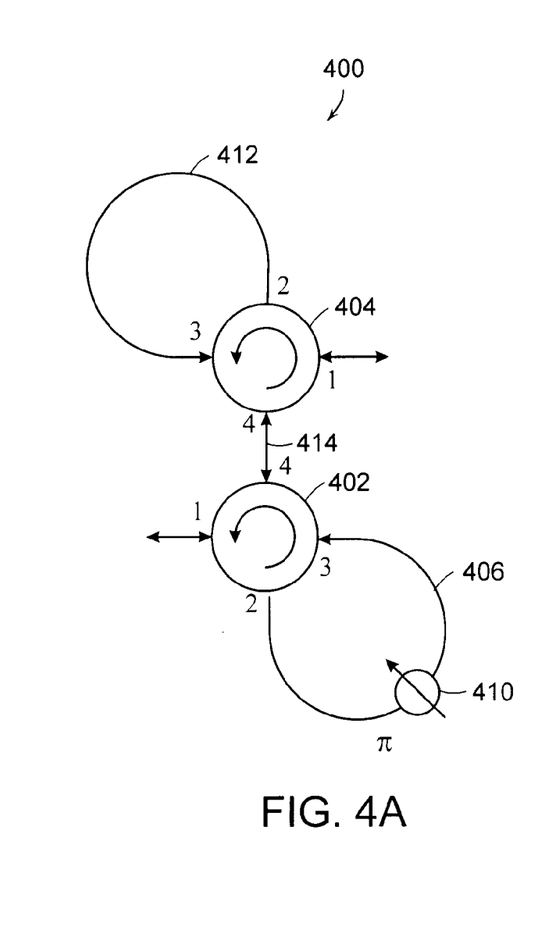
FIG. 4A illustrates one embodiment of a non-reciprocal element according to the present invention that is constructed from two four-port circulators.
Figure 4B:
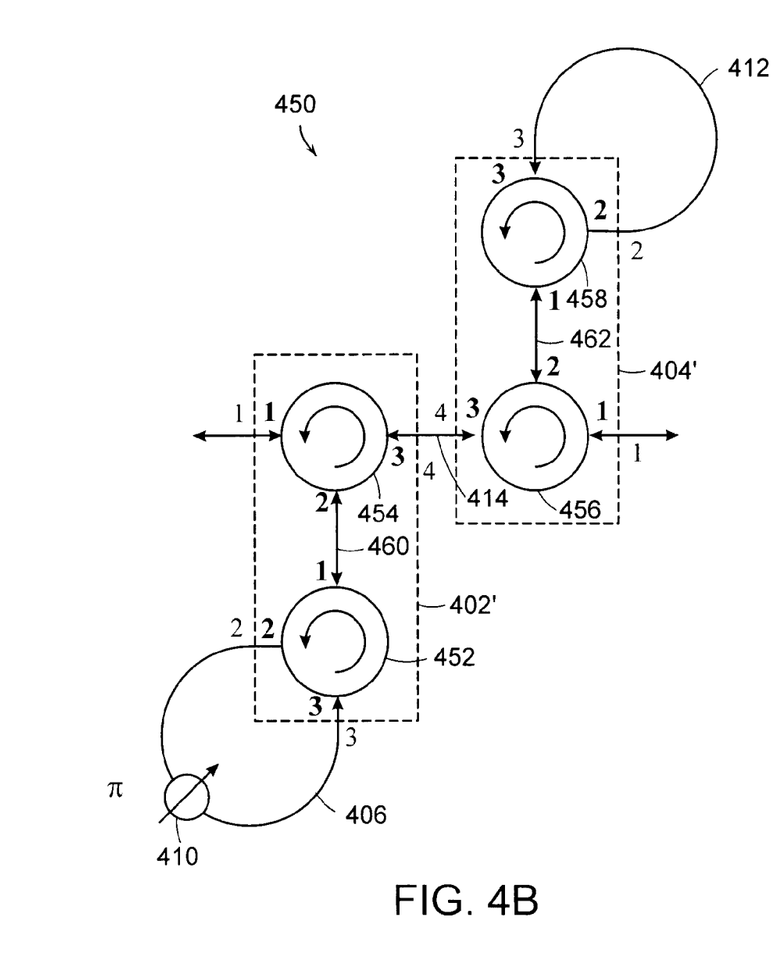
FIG. 4B illustrates the equivalent representation of the non-reciprocal element described in connection with FIG. 4A where each of the two four-port circulators is constructed from two three-port circulators.
Figure 5:
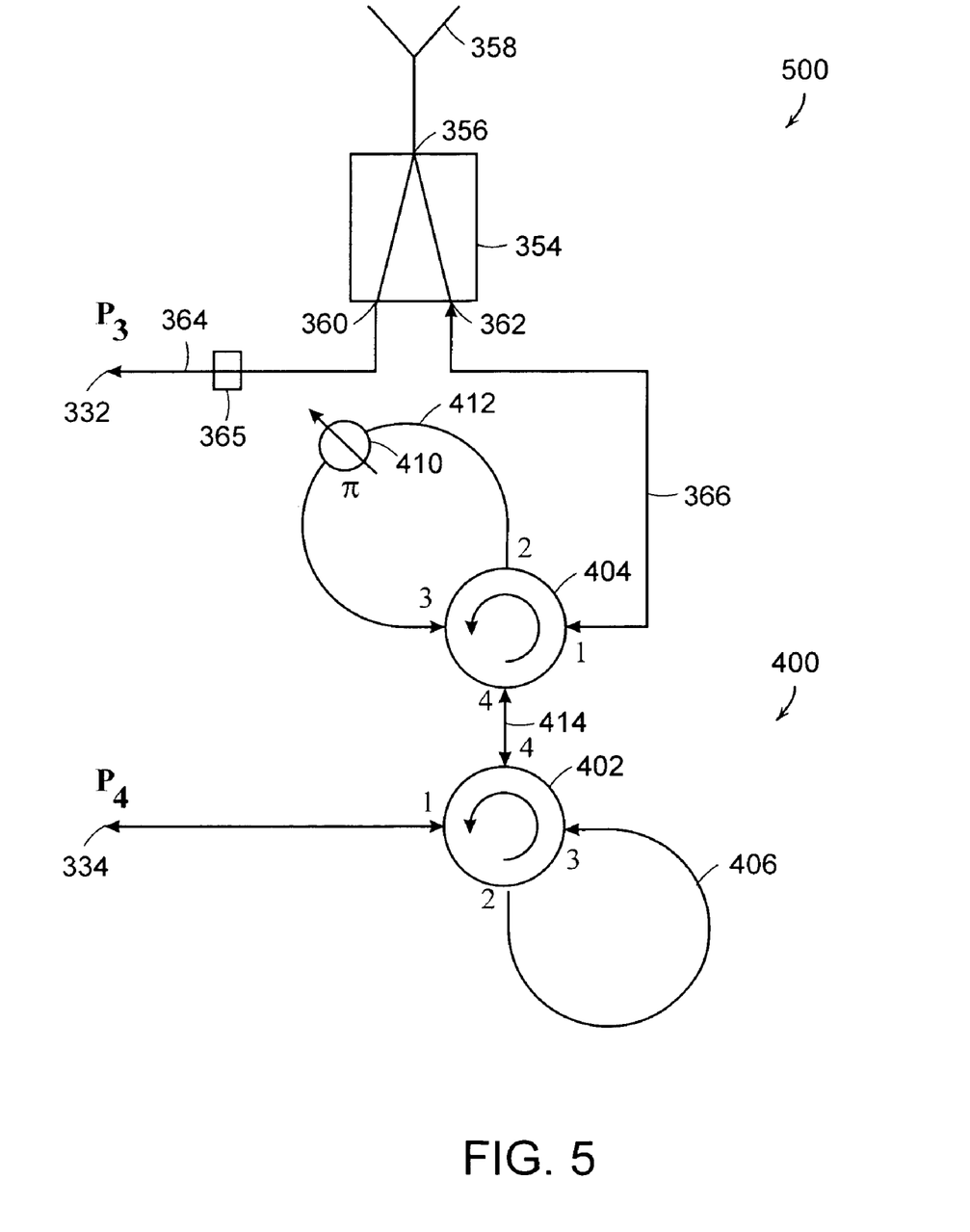
FIG. 5 illustrates one embodiment of the dual drive mode input of the signal interface of the present invention that includes the non-reciprocal element described in connection with FIG. 4.

FIGS. 4 and 5 illustrate several possible practical embodiments of the non-reciprocal element 304 of the present invention that include a combination of circulators. One skilled in the art will appreciate that there are many other ways to implement the non-reciprocal element 304. FIG. 4A illustrates one embodiment of a non-reciprocal element 400 according to the present invention that is constructed from two four-port circulators. FIG. 4B illustrates the equivalent representation of the non-reciprocal element 450 described in connection with FIG. 4A where each of the two four-port circulators is constructed from two three-port circulators.

Referring to FIG. 4A, the non-reciprocal element 400 includes a first 402 and a second four port circulator 404. The first port of the first circulator 402 and the first port of the second circulator 404 are bi-directional ports that can receive and transmit signals. The second port and the third port of the first circulator 402 are electrically connected with electrical connection 406. The electrical connection 406 includes a Pi phase shifter 410 that shifts the phase of signals propagating between the second and third ports of the first circulator 402 by 180 degrees. The second port and the third port of the second circulator 404 are electrically connected with the electrical connection 412.

The fourth port of the first circulator 402 is electrically connected to the fourth port of the second circulator 404 with electrical connection 414. In many embodiments, the electrical connection 412 has a path length that is equal to the electrical path length of electrical connection 406 that includes the path length of the phase shifter 410. In these embodiments, the accumulated phase in the electrical connection 412 is the same as the accumulated phase in the electrical connection 406 including the electrical path length associated with the Pi phase shifter 410.

The electrical path length of the electrical connection 406 must be large enough to couple the Pi phase shifter 410 into the electrical connection 406. Also, the electrical path length of the electrical connections 406, 412 are physically small in some embodiments in order to reduce frequency-dependent phase shifts. The term "physically small" is defined herein to mean small compared to a wavelength (i.e. ~15-30 mm for 10 GHz, depending on the waveguide effective index).

In operation, circulators transfer the input power at any port of the circulator to the next port of the circulator in the direction of circulation (shown by the arrows). Circulators have a phase shift between ports, which depends on the geometry of the circulator and on the materials used to construct the circulator. The non-reciprocal elements of the present invention can use circulators that have any inter-port phase shift, but the circulators must be identical, in that the phase shifts between like numbered ports of the circulators must be identical. For example, the phase shift between ports 1 and 2 in circulator 404 must be the same as the phase shift between ports 1 and 2 of circulator 402.

Signals applied to the first port of the second circulator 404 propagate to the second port, then through the electrical connection 412 and then to the fourth port of the second circulator 404. The purpose of the electrical connection 412 is to add the same phase shift (i.e. path length) of the electrical connection 406 without the 180 phase shift generated by the phase shifter 410. The signals then propagate through the electrical connection 414 to the fourth port and then to the first port of the first circulator 402, which is a bi-directional port, where the signals leave the non-reciprocal device 400.

Signals applied to the first port of the first circulator 402 will follow a different path through the non-reciprocal device 402 which includes propagation through the phase shifter 410 where the signals experience a 180 degree phase shift. Signals applied to the first port of the first circulator 402 propagate to the second port, then through the electrical connection 406 including the Pi phase shifter 410 to the third port, and then to the fourth port of the circulator 402. The signal then propagates through the electrical connection 414 to the fourth port and then to the first port of the second circulator 404, which is a bi-directional port.

Thus, the non-reciprocal device 400 is designed so that the phase change from the first port of the first circulator 402 to the first port of the second circulator 404 is equal to the phase change of the first port of the second circulator to the first port of the first circulator plus 180 degrees. This result assumes that the inter-port phase shifts for the first 402 and the second circulator 404 for like numbered ports are the same. In addition, this assumes that the phase shift caused by the electrical connections 406 and 412 are the same except for the Pi phase shift generated by the Pi phase shifter 410.

Referring to FIG. 4B, the non-reciprocal device 450 is constructed from a first 402' and a second four port circulator 404' that are each constructed from two three port circulators that are shown within the dotted lines. Many commercially available circulators are 3-port devices, so the embodiment shown in FIG. 4B can be easily constructed from stock commercial devices. The first circulator 402' includes a first 452 and a second three port circulator 454 and the second circulator 404' includes a first 456 and a second three port circulator 458. The circulators 452, 454, 456, and 458 are identical in that the phase shifts between like numbered ports of the circulators are the same.

The operation of the non-reciprocal device 450 is similar to the operation of the non-reciprocal device 400. Signals applied to the first port of circulator 456 propagate to the second port of circulator 456 and then through the electrical connection 462 to the first port and then to the second port of circulator 458. The signal then propagates through the electrical connection 412 to the third port and then the first port of circulator 458. The signal then propagates back through the electrical connection 462 to the second port and then the third port of circulator 456. The signal then propagates through the electrical connection 414 to the third port and then the first port of circulator 454, which is a bi-directional port, where the signals leave the non-reciprocal device 450.

Signals applied to the first port of the circulator 454 will follow a different path through the non-reciprocal device 450 which includes propagation through the phase shifter 410 where the signals experience a 180 degree phase shift. Signals applied to the first port of the circulator 454 propagate to the second port of circulator 454 and then through the electrical connection 460 to the first port and then the second port of circulator 452. The signals then propagate through the electrical connection 406 including the Pi phase shifter 410 and then to the first port of circulator 452. The signals then propagate through the electrical connection 460 to the second port and then to the third port of circulator 454. The signal then propagates through the electrical connection 414 to the third port and then to the first port of the circulator 456, which is a bi-directional port, where the signals leave the non-reciprocal device 450.

FIG. 5 illustrates one embodiment of the dual drive mode input 500 of the signal interface of the present invention that includes the non-reciprocal element described in connection with FIG. 4A. A first electrical signal, which can be a receive signal, from the antenna 358 or receiver, is split by the second splitter/combiner 354 into two substantially equal signals having substantially the same amplitude and phase and provides these signals at the third 360 and the fourth port 362 of the second splitter/combiner 354.

The transmission line 364 couples the second port 360 of the second splitter/combiner 354 to the third input 332 of the electrode structure 318 of the optical modulator 302. The fourth transmission line 366 couples the second port 362 of the second splitter/combiner 354 to first port of circulator 404 of the non-reciprocal device 400. The non-reciprocal device 400 shifts the first electrical signal by 180 degrees relative to the first electrical signal provided to the third input 332 of the electrode structure 360 and provides the phase shifted first electrical signal to the fourth electrical input 334 of the electrode structure 318 of the optical modulator 302. The path length stretcher 365 that is coupled into the third transmission line 364 changes the path length of the first electrical signal so that the path length of the first electrical signal and the path length of the phase shifted first electrical signal are matched.

There are many other possible embodiments of the dual drive mode input of the signal interface of the present invention. The dual drive input of the signal interface can be implemented with non-reciprocal devices that include a wide variety of circulator configurations, and inter-port phase shifts.

Figure 6:
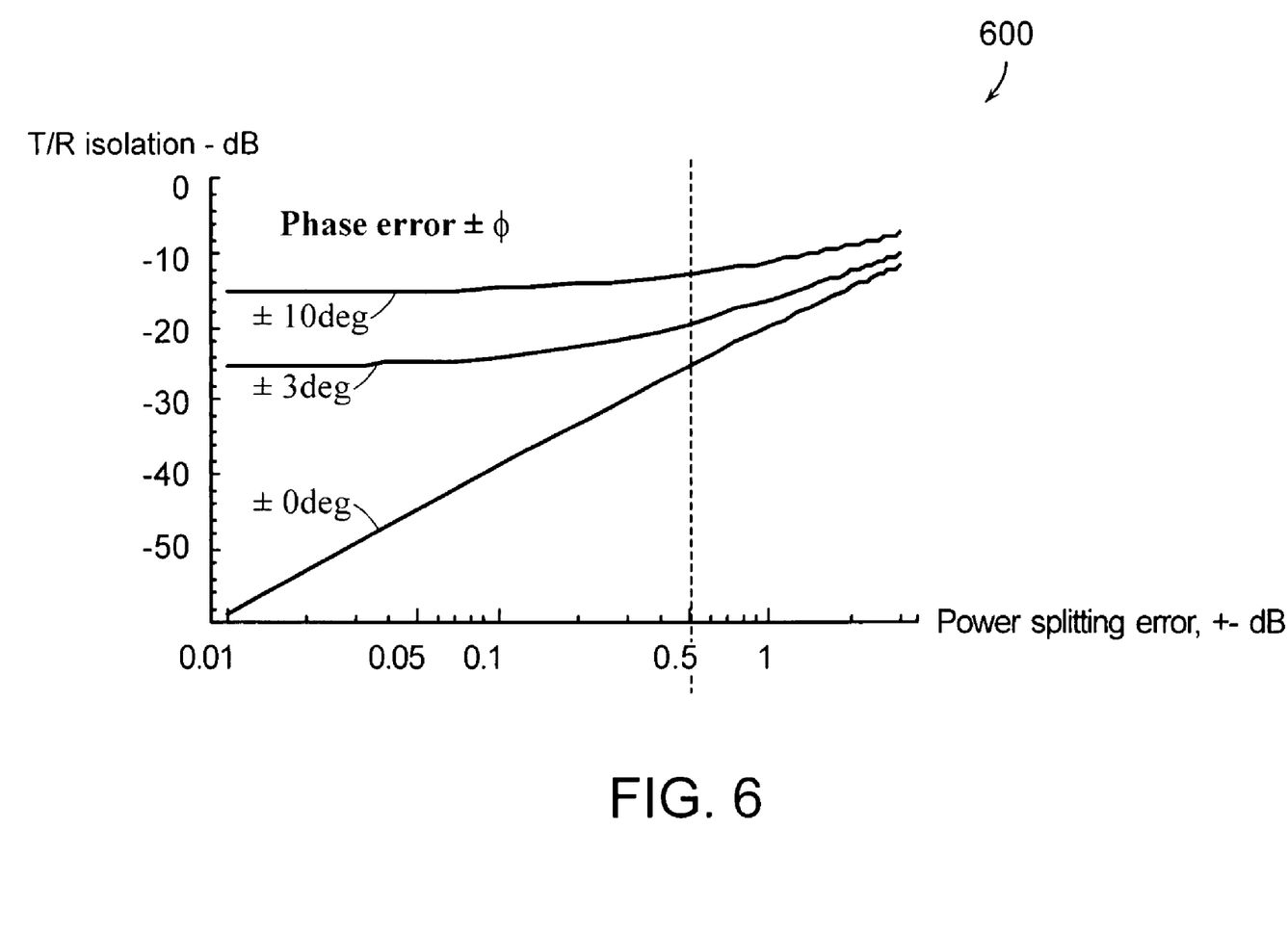
FIG. 6 is a plot of calculated data for additional T/R isolation as a function of power splitting error and phase error in the splitter/combiners for a signal interface according to the present invention with a non-reciprocal device.

FIG. 6 is a plot of calculated data 600 for additional T/R isolation as a function of power splitting error and phase error in the splitter/combiners for a signal interface according to the present invention with a non-reciprocal device. The equation used to determine the T/R isolation data is:

$$20\log_{10}\left(\frac{P_{trans}}{P_{rec}}\right)$$

where $P_{trans}$ and $P_{rec}$ are the detected transmit and receive optical powers, at the frequency of interest. The data does not include effects of counter propagating signals.

These calculations estimate the benefit of using the signal interface of the present invention.

The data shows that improving component performance can significantly improve the isolation. For example, the data indicates that for a 0.5 dB power splitting error and a 3 degree phase error in each of the two splitter/combiners, the resulting improvement in T/R isolation is about 25 dB. This improvement is in addition to the isolation provided by the counter-propagating electrical and optical fields.

Thus, the signal interface of the present invention provides significantly improved T/R isolation. The T/R isolation using practical commercially available components can be improved by about 25 dB. In addition, the dual drive configuration reduces the effective VPi of the modulator, thus improving the noise figure and the sensitivity of the systems using the signal interface, such as RF links represented by the antenna feed.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. A signal interface comprising:
   a) a non-reciprocal device having a first port that accepts a first electrical signal and a second port that accepts a second electrical signal, the non-reciprocal device passing the second electrical signal through the first port without a phase shift and passing the first electrical signal through the second port with a 180 degrees phase shift; and
   b) an optical modulator having an optical input port that receives an optical signal, a first and a second electrical input port that receive the second electrical signal, a third electrical input port that receives the first electrical signal, and a fourth electrical input port that is electrically coupled to the second port of the non-reciprocal device so that it receives the phase shifted first electrical signal, the optical modulator passing the second electrical signal to the first port of the non-reciprocal device without a phase shift and modulating the first electrical signal on the optical signal and providing the modulated optical signal at an optical output port of the optical modulator.

2. The signal interface of claim 1 wherein the optical modulator is selected from the group comprising an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic organic modulator, and an electro-optic inorganic modulator.

3. The signal interface of claim 1 wherein the optical modulator comprises an electrode structure that velocity matches the first electrical signal to an optical field of the optical signal.

4. The signal interface of claim 1 wherein the non-reciprocal element is selected from the group comprising a circulator, a gyrator, and a switch.

5. The signal interface of claim 1 wherein the optical signal is modulated by substantially all the first electrical signal.

6. The signal interface of claim 1 wherein substantially all the second electrical signal passes to the first port of the non-reciprocal device without significantly modulating the optical signal.

7. The signal interface of claim 1 further comprising a photodetector having an optical input that is coupled to the optical output port of the optical modulator, the photodetector converting the modulated optical signal to the first electrical signal.

8. The signal interface of claim 1 further comprising an attenuator that is electrically coupled to the third electrical port of the optical modulator.

9. The signal interface of claim 1 further comprising a path length stretcher that is electrically coupled to the first port of the non-reciprocal device.

10. The signal interface of claim 1 further comprising a laser that generates the optical signal at an output port that is coupled to the optical input port of the optical modulator.

11. An electro-optic bi-directional signal interface comprising:
   a) an electrical splitter/combiner having a single input/output port that receives a first electrical signal and that transmits a second electrical signal and a first and a second dual input/output port that receive a first and second portion of the second electrical signal and that transmits a first and a second portion of the first electrical signal;
   b) a non-reciprocal device having a first port that is coupled to the first dual input/output port of the electrical splitter/combiner and a second port, the non-reciprocal device transmitting the second electrical signal from the second port to the first port without a phase shift and transmitting the first electrical signal from the first port to the second port with a 180 degrees phase shift;
   c) an electrical splitter having an input that receives the second electrical signal, a first output that provides the first portion of the second electrical signal and a second output that provides the second portion of the second electrical signal; and
   d) an optical modulator having an optical input port that receives an optical signal, a first and a second electrical input port that are coupled to a respective one of the first and the second output of the electrical splitter, a third electrical input port that is electrically coupled to the second dual input/output port of the electrical splitter/combiner, and a fourth electrical input port that is electrically coupled to the second port of the non-reciprocal device, the optical modulator modulating the first electrical signal on the optical signal and providing a modulated optical signal at an optical output port of the optical modulator and transmitting the first and second portions of the second electrical signal without a phase shift so that the electrical splitter/combiner combines the first and second portion of the RF transmission approximately in phase.

12. The signal interface of claim 11 wherein the first and second portion of the second electrical signal are approximately equal.

13. The signal interface of claim 11 wherein the optical modulator is selected from the group comprising an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic organic modulator, and an electro-optic inorganic modulator.

14. The signal interface of claim 11 wherein the optical modulator comprises an electrode structure that velocity matches the first electrical signal to an optical field of the optical signal.

15. The signal interface of claim 11 wherein the non-reciprocal element is selected from the group comprising a circulator, a gyrator, and a switch.

16. The signal interface of claim 11 wherein the optical signal is modulated by substantially all the first electrical signal.

17. The signal interface of claim 11 wherein substantially all the second electrical signal passes to the first port of the non-reciprocal device without significantly modulating the optical signal.

18. The signal interface of claim 11 further comprising a photodetector having an optical input that is coupled to the optical output port of the optical modulator, the photodetector converting the modulated optical signal to a received first electrical signal.

19. The signal interface of claim 11 further comprising an attenuator that is electrically coupled between second output of the splitter/combiner and the third electrical port of the optical modulator.

20. The signal interface of claim 11 further comprising a path length stretcher that is electrically coupled between the first output of the electrical splitter/combiner and the first port of the non-reciprocal device.

21. The signal interface of claim 11 further comprising an antenna that is coupled to the single input/output port of the electrical splitter/combiner.

22. The signal interface of claim 11 further comprising a laser that generates the optical signal at an output port that is coupled to the optical input port of the optical modulator.

23. A method of interfacing a first signal and a second signal, the method comprising:
a) generating a differential mode first electrical signal by passing a portion of the first electrical signal through a non-reciprocal device to shift a phase of the portion of the first electrical signal by 180 degrees;
b) applying the differential mode first electrical signal with the 180 degree differential phase shift to a first differential input of an optical modulator;
c) modulating the differential mode first electrical signal on an optical signal;
d) generating a common mode second electrical signal by passing a portion of the second electrical signal through a non-reciprocal device that maintains a phase of the second electrical signal;
e) applying the common mode second electrical signal to a second differential input of the optical modulator;
f) transmitting the common mode second electrical signal through the optical modulator without substantial modulation; and
g) detecting the modulated first electrical signal on the optical signal.

24. The method of claim 23 wherein substantially all the common mode second electrical signals is transmitted through the optical modulator.

25. The method of claim 23 wherein at least one of the common mode second electrical signal and the differential mode first electrical signal propagate on traveling wave electrodes.

26. The method of claim 23 further comprising velocity matching the differential mode first electrical signal to an optical field of the optical signal.

27. The method of claim 23 wherein the transmitting the common mode second electrical signal through the optical modulator and the detecting the modulated first electrical signal on the optical signal occur simultaneously in time.

28. The method of claim 23 wherein the optical signal comprises a continuous wave optical beam.

29. The method of claim 23 wherein the optical signal comprises a pulsed optical beam.

30. The method of claim 23 wherein substantially all the differential mode first electrical signal is modulated by the optical modulator.

31. The method of claim 23 wherein the common mode second electrical signal is not substantially modulated by the optical modulator.

32. A method of interfacing a first signal and a second signal, the method comprising:
a) propagating a first and a second portion of a second electrical signal through a respective one of a first and a second electrical port of an optical modulator;
b) passing the first portion of the second electrical signal to an electrical output and passing the second portion of the second electrical signal to a non-reciprocal device that maintains a phase of the second portion of the second electrical signal so that the first and second portions of the second electrical signals combine substantially in phase at the electrical output;
c) applying a first portion of the first electrical signal to a third electrical input port of the optical modulator;
d) phase shifting a second portion of the first electrical signal by 180 degrees and applying the phase shifted first electrical signal to a fourth electrical input port of the optical modulator;
e) modulating an optical signal with the first electrical signal and the phase shifted first electrical signal; and
f) detecting the first electrical signal from the modulated optical signal.

33. The method of claim 32 further comprising stretching a path length of the second portion of the first electrical signal so that the path length of the second portion of the first electrical signal approximately equals a path length of the first portion of the first electrical signal.

34. The method of claim 32 wherein the combining the first and the second portions of the second electrical signal substantially in phase at the output and the detecting the first electrical signal from the modulated optical signal occur simultaneously in time.

35. The method of claim 32 wherein the optical signal comprises a continuous wave optical beam.

36. The method of claim 32 wherein the optical signal comprises a pulsed optical beam.

37. The method of claim 32 further comprising velocity matching the first electrical signal to an optical field of the optical signal.

38. The method of claim 32 wherein the optical signal is modulated by substantially all the first electrical signal.

39. The method of claim 32 wherein the optical signal is not significantly modulated by the second electrical signal.

40. The method of claim 32 further comprising attenuating the first portion of the second electrical signal so that an amplitude of the first portion of the second electrical signal approximately equals an amplitude of the second portion of the second electrical signal.

* * * * *